United States Patent Office 2,933,511
Patented Apr. 19, 1960

2,933,511
18-DIMETHYLAMINO STEROIDS

Ivar Laos and Raphael Pappo, Skokie, Ill., assignors to G. D. Searle & Co., Chicago, Ill., a corporation of Delaware No Drawing. Application May 4, 1959
Serial No. 810,596

4 Claims. (Cl. 260—397.3)

The present invention relates to a group of new 18-dimethylamino steroids. More particularly it relates to 18-dimethylamino-4-pregnen - 3 - one, to intermediates and their production.

Raphael Pappo, in his applications Serial No. 736,963, and 758,920, now Patent No. 2,891,948 has described the preparation of 3,5 - cyclo - 18 - dimethylamino-20-pregnen-6-one from coenessine. It has now been found that pharmacologically active derivatives can be prepared from this isosteroid. The first step is the hydrogenation of the 20-pregnene to yield 3,5-cyclo-18-dimethylaminopregnan-6-one, a compound which is a central nervous depressant with tranquilizing action. The 6-oxo group can be reduced to yield a mixture of the $6\alpha$ and $6\beta$-isomers of 3,5-cyclo-18-dimethylaminopregnan-6-ol which has shown a definite cortisone-like anti-inflammatory effect, noted particularly in the prevention of the heat, swelling and redness associated with tissue injury.

3,5-cyclo-18-dimethylaminopregnan-6-ol, on treatment with formic acid, yields 18-dimethylamino-5-pregnen-$3\beta$-ol formate from which the free 3-hydroxy derivative is prepared by treatment with alkanolic alkali. The resulting 18-dimethylamino-5-pregnen-$3\beta$-ol produces 18-dimethylamino-4-pregnen-3-one on Oppenauer oxidation. This compound has antifungal action and specifically it inhibits the growth of Trichophyton-like fungi.

These compounds form salts with inorganic and strong organic acids, including sulfuric, phosphoric, hydrochloric, hydrobromic, hydroiodic, sulfamic, citric, lactic, maleic, nicotinic, malic, succinic, tartaric, cinnamic, acetic, benzoic, gluconic, ascorbic, and related acids. They also form quaternary ammonium salts with a variety of organic esters of sulfuric, hydrohalic and aromatic sulfonic acids. Among such esters are methyl chloride, bromide and iodide; ethyl chloride, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide.

The compounds of this invention and their preparation will appear in further detail from the following examples which are not to be construed as limiting the invention in spirit or in scope. In these examples quantities are indicated in parts by weight.

Example 1

A solution of 10.2 parts of 3,5-cyclo-18-dimethylamino-20-pregnen-6-one in 250 parts of ethyl acetate is hydrogenated at atmospheric pressure and about 25° in the presence of 1.5 parts of a 5% palladium-on-carbon catalyst. Hydrogen uptake is completed after 3 hours. The catalyst is removed by filtration and the filtrate is taken to dryness by vacuum distillation. On recrystallization from ethanol 3,5-cyclo-18-dimethylaminopregnan-6-one is obtained melting at about 109.5–110.5° C. The compound has the structural formula

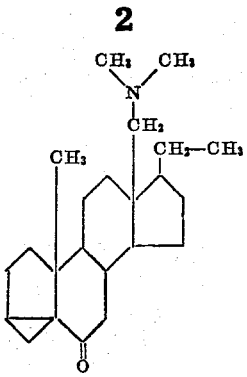

Example 2

To a suspension of 5.7 parts of lithium aluminum hydride in 150 parts of purified tetrahydrofuran is added in the course of 5 minutes a solution of 6.5 parts of 3,5-cyclo-18-dimethylaminopregnan-6-one in 130 parts of purified tetrahydrofuran. The resulting mixture is stirred and refluxed under a nitrogen atmosphere for 3 hours, chilled and decomposed with aqueous tetrahydrofuran and then treated with a 20% sodium hydroxide solution. Then 150 parts of ether are added to the mixture and the inorganic salts are removed by filtration. Most of the solvents are removed by vacuum distillation and water is then added to the concentrate. The resulting solid precipitate is dissolved in ether, washed with water, dried and concentrated to a colorless oil. This oil is dissolved in an 0.5% solution of ethyl acetate in benzene and thus poured through a chromatography column containing 600 parts of alumina. There is thus obtained a mixture of $6\alpha$ and $6\beta$-isomers of 3,5-cyclo-18-dimethylaminopregnan-6-ol.

Example 3

A solution of 6.1 parts of 3,5-cyclo-18-dimethylaminopregnan-6-ol in 110 parts of 98% formic acid is permitted to stand at room temperature for 48 hours. The unreacted formic acid is then removed by vacuum distillation while the reaction mixture is maintained at or below room temperature. The residual oil contains, besides the formate of 18-dimethylamino-5-pregnen-$3\beta$-ol, some formic acid. The oil is dissolved in 25 parts of methanol and neutralized with methanolic potassium hydroxide. Then 1.7 parts of excess potassium hydroxide in 25 parts of methanol are added followed by 1 part of water and the reaction mixture is refluxed under a nitrogen atmosphere for 3 hours. Most of the methanol is then removed by vacuum distillation and the residue is diluted with water and extracted with ether. The ether extract is washed with 5% aqueous potassium bicarbonate and then with water and dried over sodium sulfate. On evaporation of the ether a residue is obtained which on recrystallization from methanol yields 18-dimethylamino-5-pregnen-$3\beta$-ol melting at about 137–139° C.

Example 4

To a solution of 1.25 parts of 18-dimethylamino-5-pregnen-$3\beta$-ol in 50 parts of anhydrous toluene are added 12 parts of anhydrous cyclohexanone and 5 parts of the resulting solution are distilled off. To the remaining refluxing solution there is added in the course of 5 minutes a solution of 1.47 parts of aluminum isopropoxide in 18 parts of toluene. The reaction mixture is refluxed for 45 minutes longer after which it is taken to room temperature and diluted with 110 parts of ether. The resulting mixture is extracted with a solution of 5.5 parts of concentrated hydrochloric acid in 100 parts of water. The extract is washed with ether, rendered alkaline by addition of aqueous sodium hydroxide solution and then extracted with ether. This ether extract is washed successively with water, aqueous sodium bicarbonate solution, and again with water and dried over sodium sulfate. The solvent is then removed by distillation to yield 18-dimethylamino-4-pregnen-3-one which, after recrystallization from petroleum ether, melts at about 90–91.5° C. It shows an ultraviolet absorption spectrum at 241 millimicrons with a molecular extinction coefficient of about 17,200. The product has the structural formula

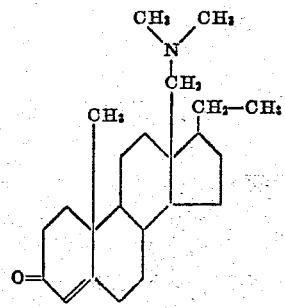

What is claimed is:
1. 3,5-cyclo-18-dimethylaminopregnan-6-one.
2. 3,5-cyclo-18-dimethylaminopregnan-6-ol.
3. 18-dimethylamino-5-pregnen-3β-ol.
4. 18-dimethylamino-4-pregnen-3-one.

References Cited in the file of this patent
Pappo: J.A.C.S., vol. 81, pages 1010–11 (1959).